(12) United States Patent
Xu

(10) Patent No.: US 7,603,418 B1
(45) Date of Patent: Oct. 13, 2009

(54) SEQUENCE NUMBER RESETTING FOR SYNCHRONIZING TRANSFERS IN A DIGITAL NETWORK

(75) Inventor: Hong Xu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1033 days.

(21) Appl. No.: 10/766,607

(22) Filed: Jan. 27, 2004

(51) Int. Cl.
*G06F 15/16* (2006.01)
*G01R 31/08* (2006.01)

(52) U.S. Cl. ............... 709/206; 370/229; 370/231; 370/235

(58) Field of Classification Search ............ 709/206; 370/229, 231, 235
See application file for complete search history.

(56) References Cited

U.S. PATENT DOCUMENTS

| | | | | |
|---|---|---|---|---|
| 6,978,384 | B1 * | 12/2005 | Milliken | 726/26 |
| 6,987,981 | B2 * | 1/2006 | Kuo | 455/502 |
| 2001/0052072 | A1 * | 12/2001 | Jung | 713/160 |
| 2003/0081664 | A1 * | 5/2003 | Lu et al. | 375/222 |

OTHER PUBLICATIONS

Andrew Tanenbaum, Computer Networks, 1996 bu Prentice Hall PTR, third edition, section 3.4: Sliding Window Protocols, pp. 202-219.*
Network Working Group (Martini et al.), "Encapsulation Methods for Transport of ATM Over IP and MPLS Networks," Internet Draft, draft-ietf-pwe3-atm-encap-04.txt, Dec. 2003, 36 pp.

* cited by examiner

*Primary Examiner*—Nathan J Flynn
*Assistant Examiner*—Jeong S Park
(74) *Attorney, Agent, or Firm*—Trellis IP Law Group, PC

(57) ABSTRACT

A system and method for re-synchronizing or resetting packet sequence numbers including allowing a sender to send packets with a special sequence number pattern to cause convergence of the sequence numbers on a receiver side. In a preferred embodiment, no explicit routing protocol based sync-up between Sender and Receiver is required. One embodiment of the invention can provide for a maximum drop of two packets regardless of network bandwidth between sender and receiver, or of the processing power of the sender or receiver. In another embodiment, resynchronization can be achieved with no, or one, packets dropped. The implementation can be solely on a sending side of the transfer so that a receiver can operate according to standard protocols and sequencing rules without modification.

20 Claims, 3 Drawing Sheets

SEQUENCE NUMBER RESETTING FOR SYNCHRONIZING TRANSFERS IN A DIGITAL NETWORK

BACKGROUND OF THE INVENTION

This invention relates in general to digital networks and more specifically to synchronizing packet transfers over a digital network.

Many of today's digital networks use packet transfers. Data to be transferred is separated into relatively small blocks called packets that including a header and other possible information. The packets are then sent over the network and reassembled. Due to signal and line noise, processing or transfer errors, equipment failure, interruptions, suspensions, routing changes, re-ordering operations or other events, packets can be received out-of-order or corrupted or even lost completely during transfer.

One approach provided by the prior art to improve packet transmission and reception is to include a "sequence number" as part of a packet's information. A sender, or sending device, includes a sequence number in each packet. A starting sequence number is agreed upon by the sender and receiver. Subsequent sequence numbers are typically incremented by one so that each packet has a sequence number that is incrementing in a series.

Such an approach is used, for example, in the Internet with Transmission Control Protocol (TCP) and in "core" or backbone transfers with Virtual Private Network (VPN) sequence numbers. Other protocols and networks also employ packets and sequence numbers. By comparing a received packet's sequence number with an expected sequence number (i.e., the next sequence number expected in the series) a receiver, or receiving device, has some ability to detect missing or out-of-sequence packets, and to reorder the packets or take other corrective measures to recover the entire data that was intended to be transferred.

The use of sequence numbers is not without limitations and shortcomings. In popular packet protocols the sequence number is typically limited to 16 bits to save space since the sequence number must be transmitted with every packet. The sequence number is represented as a positive integer so that the range of possible sequence numbers is 0 to 65535. Because of this, when a sequence number needs to be incremented past 65535, the sequence number is instead reset to 1 (the sequence number 0 is reserved). This effect is also called "wraparound". Since a receiving device is aware of the wraparound condition this does not pose a problem to accurate use of the sequence numbers.

Another property of current sequence number approaches is that they usually are designed to handle cases where packets are received out of order. They should also permit a receiver to use portions of data where a short interruption causes some packets to be lost but where it is still desirable for the receiver to continue working with as much of the intended data as possible. Otherwise the receiver must make a new request for lost or interrupted data, or might have to cause a reset of the sender and/or receiver or other time-consuming exchange. For this reason, it is typically acceptable for sequence numbers to deviate substantially from strict adherence to the incrementing series and a packet with the deviating sequence number will still be considered valid, or accepted, and is said to have "passed" the sequence number test and be "in order."

In VPN sequence numbers, for example, the deviation between the expected sequence number and an acceptable sequence number can vary by as much as 32768, or approximately half of the maximum number, 65535. One way to look at this is that the "window" of acceptable sequence numbers can be approximately one-half of the total range of possible sequence numbers. The rules for determining whether a packet is in-order are usually a bit more complex than a simple, single window. For example, an IETF draft referred to as "draft-ietf-pwe3-atm-encap-02" proposes the following sequence number checking algorithm for a received packet:

if the sequence number on the packet is 0, then the packet passes the sequence number check otherwise if the packet sequence number>=the expected sequence number and the packet sequence number−the expected sequence number<32768, then the packet is in order.

otherwise if the packet sequence number<the expected sequence number and the expected sequence number−the packet sequence number>=32768, then the packet is in order.

otherwise the packet is out of order.

If a packet passes the sequence number check, or is in order then, it can be delivered immediately. If the packet is in order, then the expected sequence number should be set using the algorithm:

expected_sequence_number:=packet_sequence_number+1 mod 2**16 if (expected_sequence_number=0) then expected_sequence_number:=1;

Packets which are received out of order MAY be dropped or reordered at the discretion of the receiver.

If a router PE2 does not support receive sequence number processing, then the sequence number field MAY be ignored.

Although not stated in the above sequence number checking rules, if a packet's sequence number fails then the expected sequence number is not changed for the next packet.

In VPN applications the network transactions are typically transferred over core network components that provide high-bandwidth, real-time long distance transfers. In these applications a sender may have to restart sequence numbering during normal cases like High Availability (HA), user configuration change, etc. If a receiver is not notified about the restart of sequence numbering, many packets could be dropped by mistake. For example, if the receiver is expecting sequence number 1,000 on a next packet and the sender restarts sequence numbering from 1 then the subsequent 999 packets will be dropped.

A common approach to solve the above problem requires that the sender and receiver sync-up on a new starting sequence number by using so-called "out-of-band" communications such as by sending special packet or header information to notify a receiver that the sequence numbers need to be re-synchronized. For example, the receiver can indicate to the sender that data has been dropped and must be resent. The sender then acknowledges this request and begins transmitting with a starting sequence number of 1. However, in Layer2 VPN services, the sender and receiver can be thousands of miles away across one or more Internet backbones. The new sequence number sync-up can easily take so much time that a large number of packets can be dropped. For example, a 100 msec delay on an OC192 link can cause up to few million packets to be dropped on the receive side before the receiver re-syncs with sender.

SUMMARY OF EMBODIMENTS OF THE INVENTION

In one embodiment the invention allows a sender to send packets with a special sequence number pattern to cause resynchronization, resetting or convergence of the sequence numbers on a receiver side. In a preferred embodiment, no explicit routing protocol based sync-up between Sender and Receiver is required. One embodiment of the invention can provide for a maximum drop of two packets regardless of network bandwidth between sender and receiver, or of the processing power of the sender or receiver. In another embodiment, resynchronization can be achieved with no, or one, packets dropped. The implementation can be solely on a sending side of the transfer so that a receiver can operate according to standard protocols and sequencing rules without modification.

In one embodiment the invention provides a method for re-synchronizing packets transferred in a digital network, wherein a packet includes a sequence number, the method comprising detecting interruption of a series of packets transferred over the digital network; sending first and second packet sequence numbers so that a third packet sequence number will be accepted as an in-order sequence number regardless of a sequence number value of a packet sent prior to the interruption.

In another embodiment the invention provides a method for resynchronizing packets transferred in a digital network, wherein a packet includes a sequence number, the method comprising receiving a series of packets over the digital network; and receiving first and second packet sequence numbers so that a third packet sequence number will be accepted as an in-order sequence number regardless of a sequence number value of a packet sent prior to the interruption.

In another embodiment the invention provides a system for resynchronizing packets transferred in a digital network from a sender to a receiver, wherein a packet includes a sequence number, the method comprising detecting interruption of a series of packets transferred over the digital network; and sending and receiving first and second packet sequence numbers so that a third packet sequence number will be accepted as an in-order sequence number regardless of a sequence number value of a packet sent prior to the interruption.

In another embodiment the invention provides a method for synchronizing the transfer of sequence numbers over a digital network, wherein an expected sequence number is compared to a received sequence number to determine if the received sequence number is acceptable, wherein a sequence number is acceptable if it is within a group of sequence numbers defined with respect to the expected sequence number, wherein there are k possible sequence number values, the method comprising sending a series of m sequence numbers, where m is substantially less than k, wherein the series of m sequence numbers ensures that a subsequently sent starting sequence number is guaranteed to be accepted; and sending the starting sequence number.

DETAILED DESCRIPTION OF EMBODIMENTS OF THE INVENTION

A preferred embodiment of the invention is useful in high-speed, real time packet transfers where it is inefficient to use protocol based signaling in order to achieve resynchronization, or resetting of sequence numbers between a sender and a receiver.

Figure 1:
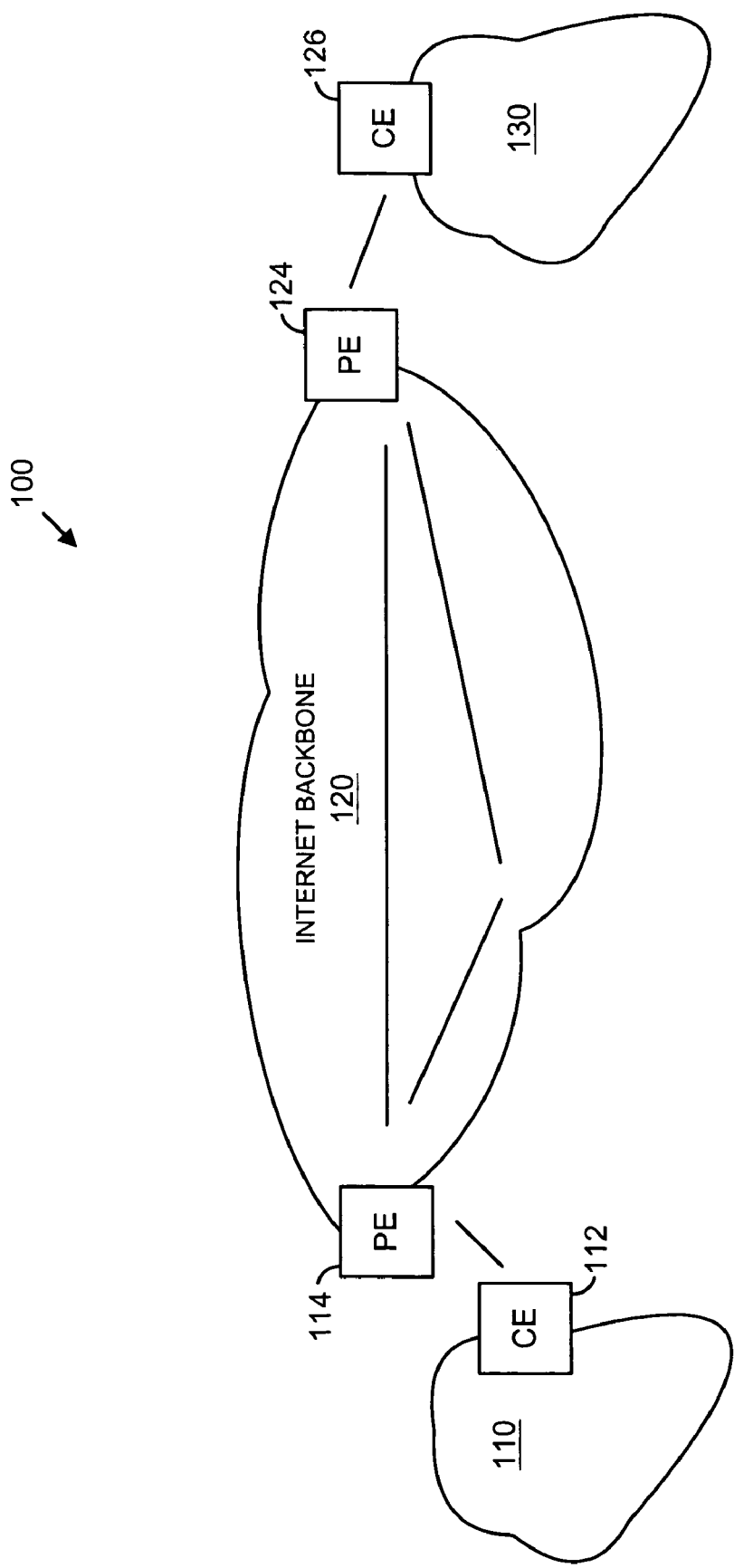
FIG. 1 is a diagram of a VPN network.

FIG. 1 illustrates an example of a suitable application. In FIG. 1, VPN 100 includes customer networks 110 and 130 from which a sender and receiver, respectively accomplish a transfer. Customer network 110 communicates with Internet backbone 120 with customer edge router 112 in communication with provider edge 114.

Customer edge (CE) routers peer with provider edge routers over a Layer 2 connection. Packets sent from one customer site to another are sent as normal (unlabeled) IP Layer 2 packets to the PE router, where labels are applied based on the incoming interface (which determines the VPN membership) and the destination. The routers use Multiprotocol Label Switching (MPLS) to carry the Layer 2 packets across the provider backbone in a Level 2 network. Labels are used instead of Layer 2 addresses to accommodate overlapping IP Layer 2 addresses belonging to different customers. Because the incoming interface is used to determine what labels to apply and accepts only unlabeled packets, customers are prevented from attempting to fool or "spoof" their way into another VPN. Provider edge router 124 receives the packets and transfers them to customer edge router 126 where the packets enter customer network 130 and are sent to the receiver.

A preferred embodiment of the invention allows a sender to send a small number (e.g., 2) of packets to ensure that the receiver will be synchronized to a starting sequence number for a new series of packets. In the preferred embodiment, the desired starting sequence number for the new series is 1. In order to ensure that the receiver will recognize a sequence number of value 1 as a valid sequence number the sender forces the expected sequence number of the receiver to be a value such that a next received packet with sequence number 1 will be accepted as an in-order packet, or "pass."

Figure 2:
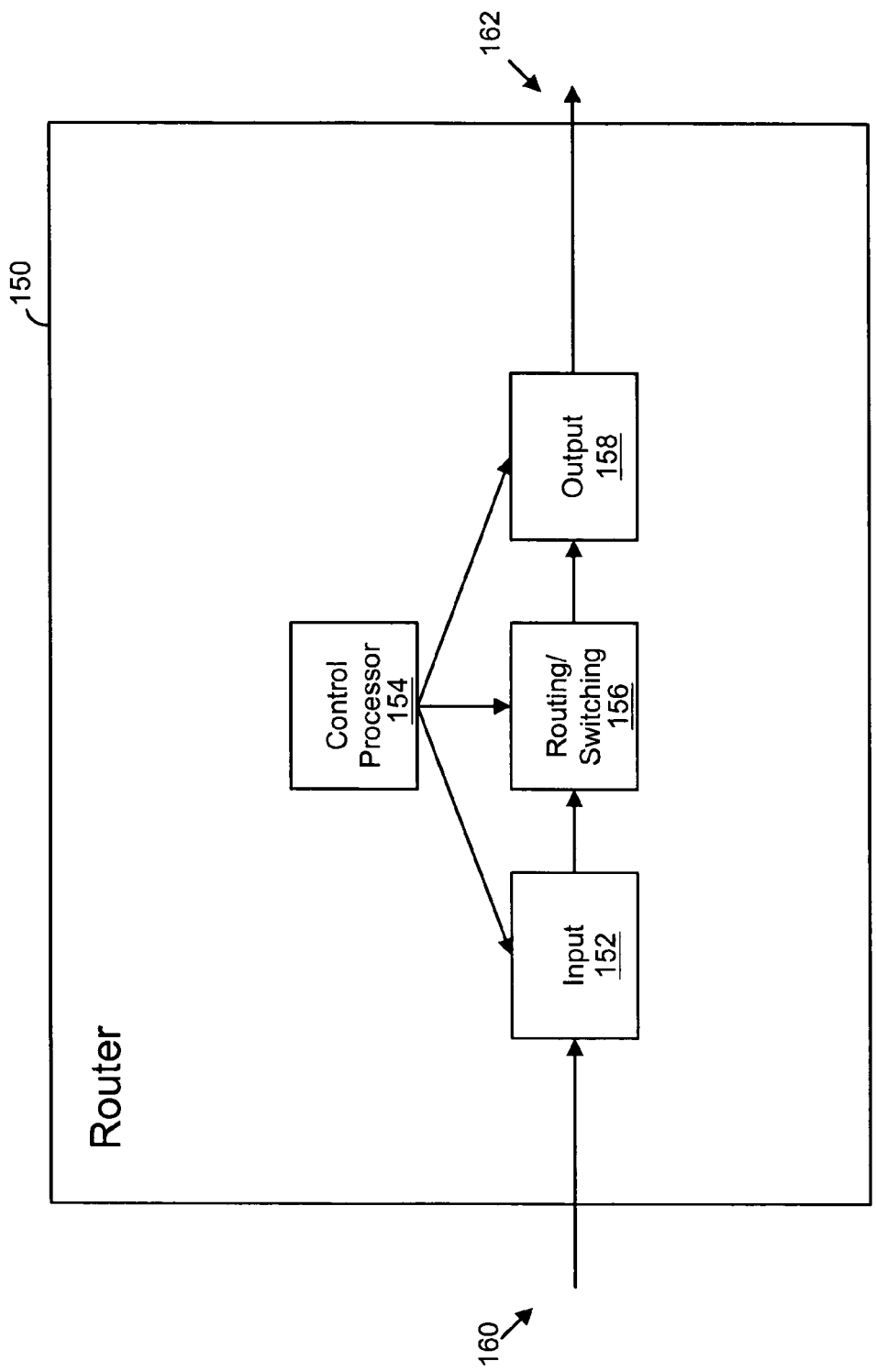
FIG. 2 shows basic components of a router.

FIG. 2 illustrates basic components in a router suitable for use with the invention. In FIG. 2, router 150 includes control processor 154 for controlling other subsystems and components in the router such as input 152, routing/switching 154 and output 156. Control processor 154 can include any number and type of processing devices, data and instructions. Control processor 154 can include, memory, disk drives, or other types of storage; and can include communication or transmission means and other resources. Any type of suitable processing architecture can be used.

Packets or other data units to be routed or switched enter router 150 at input 152. The packets can have a header, payload or other information including sequence numbers. The router can store and route or switch the packets via router/switcher 154, using tables, indexes or any suitable approach. Output 158 can condition the packets for transmission and can assign new sequence numbers according to the present invention. Any of the steps or functions described herein can be performed at one or more of the subsystems shown in FIG. 2. For example, the determination and assignment of sequence number to packets for purposes of performing sequence number resetting can be done at control processor 154, output 158 or by another subsystem. Assignment of sequence numbers can be provided by a source external to router 150, as where a central controller communicates sequence numbers to router 150 via a network, bus, or other wired, wireless, optical or other means.

Figure 3:
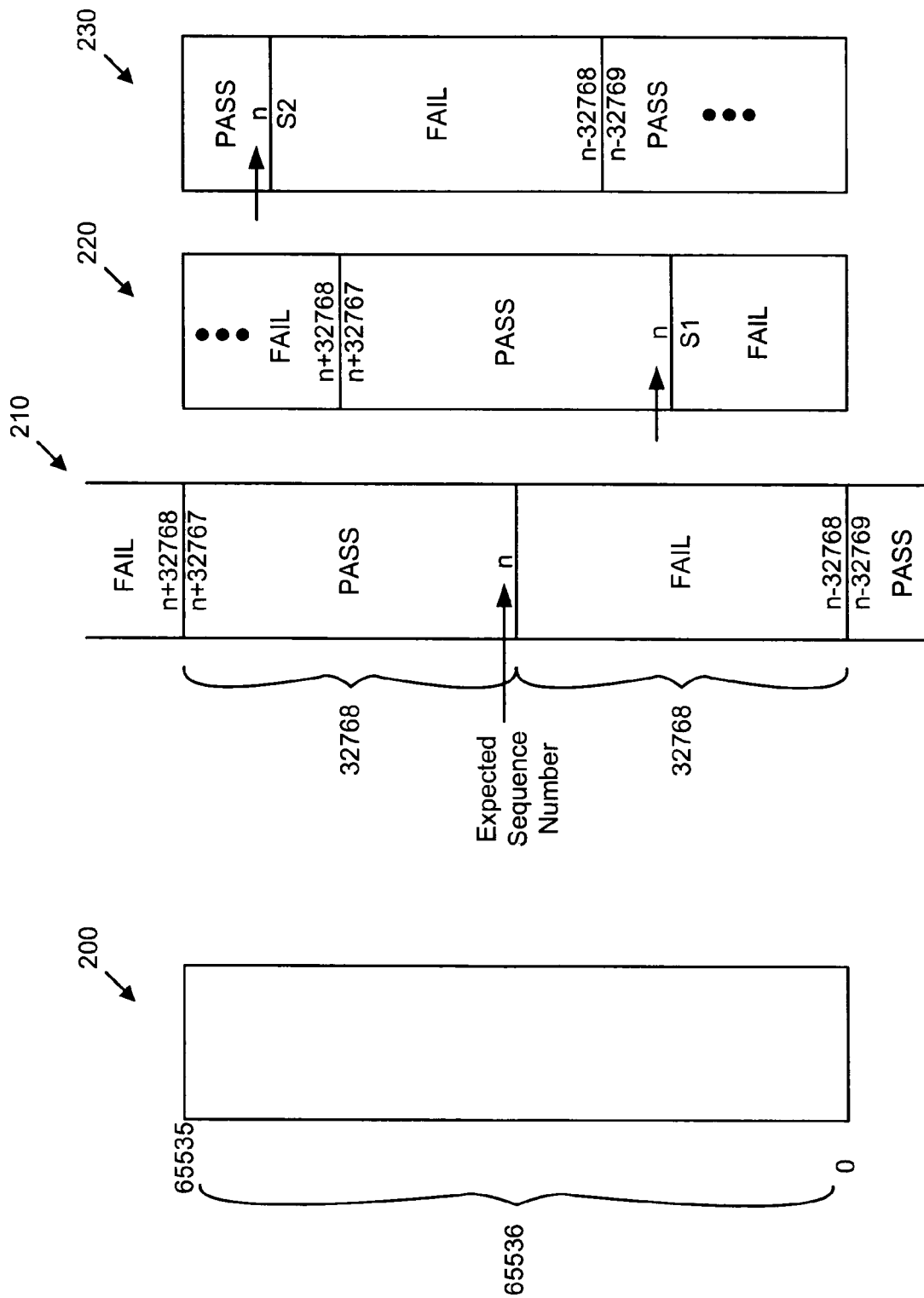
FIG. 3 shows diagrams illustrating pass and fail determinations in a space of sequence numbers.

FIG. 3 shows diagrams illustrating pass and fail determinations in a space of sequence numbers. In FIG. 3, diagram 200 illustrates the space of all possible sequence numbers ranging from 0 to 65535 in an application where sequence numbers are 16-bit integers. Diagram 210 illustrates that for an arbitrary expected sequence number, n, the received sequence numbers that will pass are those that are within a range of 32768 numbers equal to or greater than the expected sequence number, or those that are more than 32768 less than the expected sequence number. Similarly, sequence numbers in a range of 1 to 32768 less than the expected sequence number, or more than 32767 greater than the expected sequence number will fail.

Diagrams 220 and 230 show that the pass and fail ranges can be visualized by positioning diagram 210 so that the expected sequence number, n, is one above a received sequence number, S1 or S2, respectively. In diagram 220, for a received sequence number S1 in the bottom portion of the space of sequence numbers, the expected sequence number, n, is set at S1+1. Thus, the next received sequence number must be in the range S1+1 to S1+32768 to pass. In diagram 230, for a received sequence number S2 in the top portion of the space of sequence number, the expected sequence number is set at S2+1 and in order for a next sequence number to pass it must be in the range of S2+1 to 65535 or from 0 to S2+1-32769.

Using the rules for received sequence numbers it is evident that when the expected sequence number is between 32769 and 65535, inclusive, a received packet sequence number of 1 will pass. The receiver's expected sequence number can be set to a value in the range 32769-65535, inclusive, by getting the receiver to accept a packet with a sequence number in the range of 32768-65534, inclusive. In order to ensure that a sequence number in the range of 32768-65534, inclusive, is accepted, another packet having a smaller sequence number not more than 32767 values away is first sent to the receiver. Note that this approach allows many different sequence number values and combinations of sequence number values to be used to achieve the goal of sequence number resetting. The following sections describe two different implementations using different sequence number values.

An example of an application of the invention can be where Automatic Protection Switching (APS) is used in SONET. Assuming a sender has two interfaces and it is necessary to switch over from one interface to another, the newly-active interface can perform as follows:

After switch-over, the newly active linecard LC sets the sequence number in the 1st packet to be 21845. It sets the sequence number in the 2nd packet to be 43690. It sets the sequence number in the 3rd packet to be 1. From then on, the subsequent packets will have their sequence numbers 2, 3, 4, ... (always increment by 1 till wrap-around). Depending on the expected sequence number on the peering PE at the time of switch over, using the above scheme, the peering PE may drop only 2 packets in the worst case and no packet drop in the best case.

To illustrate assume that X represents the expected sequence number on the peering PE.

(Case 1) If X<=21845, the 1st packet from switch-over is in order. Subsequent packets are all in order.

(Case 2) If 21845<x<=43690, the 1st packet from switch-over will be drop. However, the 2nd packet is in order. Subsequent packets are all in order.

(Case 3) If 43690<x<=54613, both the 1st packet and 2nd packet are dropped. However, the 3rd packet with sequence number 1 is in order. Subsequent packets are all in order.

(Case 4) If X>54613, the 1st packet is in order. The 2nd and 3rd packets are in order, and subsequent packets are all in order.

As discussed, many combinations of different numbers can be used to achieve sequence number resetting. For example, for the three-number approach, different combinations of three numbers, X1, X2, and X3 can be used across the span of possible sequence numbers (except for zero), e.g., from 1 to 65535. The requirements are that the distance between X1 and X2, the distance between X2 and X3, and the distance between X3 and X1, are smaller than half of window range defined by the pass/fail algorithm at the receive. For example, today's standard uses a window of 32768, as discussed above. Once the chosen three numbers are sent, the transmitter can use the regular pattern based the last number (e.g., X3=1), to start a new sequence as 2, 3, 4, 5, .... Different numbers can be chosen for X1, X2, and X3 as long as the distance requirements, dictated by the receiver's resetting algorithm, are followed.

In another embodiment the sequence numbers 32768 and 65535 are used to obtain synchronization similar to the above case. Subsequent packets again proceed in a sequence in the series 1, 2, 3, .... In this embodiment at most only one packet will be lost and it is possible that no packets will be lost. Other embodiments may obtain other advantages due to different selections of sequence numbers used to cause a resetting or synchronizing according to the present invention. Note that these approaches do not require any change in receivers, assuming that the receiver is operating in accordance with one or more of the rules described in the Background section.

Other variations are possible. For example, more than 2 packets can be used to cause resetting. This may be desirable to prevent cases where one or more of the resetting packets are lost. In general, any number of resetting packets can be transferred. The packets containing the resetting sequence numbers can have associated data (i.e., "payload") and header information, as desired. Since it is possible to lose the first one or two resetting packets it may be desirable not to include a payload with these packets. Any combination of the resetting packets can be repeated several, or many times, to further ensure that the receiver has received enough resetting packets to have attained resynchronization at the desired starting sequence number.

The invention can be extended to more than three sequence numbers used in a resetting scheme. For example, four numbers can be used where the difference, or incremental, between the numbers is approximately ¼ of the full window size. Where five numbers are used the incremental is approximately (or exactly) ⅕ of the full window size.

In a general case, k numbers can be used and the incremental is approximately 1/k of the full window size. Each of these schemes can allow a packet loss of up to k−1 packets. In most applications it is desirable to use a small value for k such as 2 or 3 as demonstrated in this application. If k is chosen to be too big, the benefit becomes much smaller because up to k−1 packets would be lost.

In general, any number of bits can be used to represent the sequence numbers, and any data format or structure can be employed. Sequence numbers can increment, or decrement by the value 1 or any other value as desired. In some applications it may be desirable to maintain a same sequence number over multiple packets or to allow skipping of sequence numbers.

Although the invention has been discussed with respect to specific embodiments thereof, these embodiments are merely illustrative, and not restrictive, of the invention. For example, although specific protocols have been used to describe embodiments, other embodiments can use other transmission protocols or standards. Use of the terms "peer," "client" and "server" can include any type of device, operation or other process. The present invention can operate between any two processes or entities including users, devices, functional systems or combinations of hardware and software. Peer-to-peer networks and any other networks or systems where the roles of client and server are switched, change dynamically, or are not even present are within the scope of the invention.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for synchronizing transfer of sequence numbers over a digital network, wherein an expected sequence number is compared to a received sequence number to determine if the received sequence number is acceptable, wherein a sequence number is acceptable if the sequence number is within a group of sequence numbers defined with respect to the expected sequence number, the method comprising:
determining first and second sequence numbers for communication from a sender, the first and second sequence numbers being in a range from a minimum value to a maximum value, wherein a value difference between the first and second sequence numbers is greater than one, and wherein neither the first sequence number nor the second sequence number has a value of one;
sending the first sequence number to a receiver, wherein the receiver includes an unknown expected sequence number;
sending the second sequence number to the receiver, wherein the first and second sequence numbers have values such that a subsequently sent starting sequence number is guaranteed to be acceptable by the receiver regardless of a value of the unknown expected sequence number in the receiver; and
sending the starting sequence number to cause a resetting of the receiver to the starting sequence number, the starting sequence number being equal to one.

2. The method of claim 1, wherein at least one of the sequence numbers is transferred with associated data.

3. The method of claim 2, wherein the sequence number and associated data include a packet.

4. The method of claim 3, wherein the packet corresponding to the first sequence number is without a payload.

5. The method of claim 3, wherein the packet corresponding to the second sequence number is without a payload.

6. The method of claim 1, wherein the value difference between the first and second sequence numbers is approximately one third of the range.

7. The method of claim 6, wherein the first sequence number has a value that is approximately one-third of the maximum value in the range, and wherein the second sequence number has a value that is approximately two-thirds of the maximum value in the range.

8. The method of claim 7, wherein each sequence number is 16 bits, wherein the range is from 0 to 65535.

9. The method of claim 8, wherein the first sequence number has the value 21845 and wherein the second sequence number has the value 43690.

10. The method of claim 6, wherein the first sequence number has a value that is approximately one-half of the maximum value, and wherein the second sequence number has a value that is approximately the maximum value.

11. The method of claim 10, wherein each sequence number is 16 bits, wherein the range of each of the sequence numbers is from 0 to 65535.

12. The method of claim 11, wherein the first sequence number has a value of 32768 and wherein the second sequence number has a value of 65535.

13. The method of claim 1, further comprising determining a next sequence number after the starting sequence number as equal to two.

14. The method of claim 1, further comprising incrementing each subsequent sequence number after the resetting of the receiver by one over a previous sequence number.

15. An apparatus for resynchronizing packets transferred in a digital network, wherein a packet includes a sequence number, the apparatus comprising:
at least one processor;
a computer-readable storage device including instructions executable by the at least one processor for:
determining first and second packet sequence numbers for communication from a sender, the first and second packet sequence numbers being in a range from a minimum value to a maximum value, wherein a value difference between the first and second packet sequence numbers is greater than one, and wherein neither the first sequence number nor the second sequence number has a value of one;
sending the first packet sequence number to a receiver, wherein the receiver includes an unknown expected packet sequence number;
sending the second packet sequence number, wherein the first and second packet sequence numbers have values such that a subsequently sent starting packet sequence number is guaranteed to be acceptable by the receiver regardless of a value of the unknown expected packet sequence number in the receiver; and
sending the starting packet sequence number to cause a resetting of the receiver to the starting packet sequence number, the starting sequence number being equal to one.

16. The apparatus of claim 15, wherein the maximum value for the packet sequence numbers is predefined, wherein the first packet sequence number has a value of approximately one-third of the maximum value, and wherein the second packet sequence number has a value of approximately two-thirds of the maximum value.

17. The apparatus of claim 15, wherein the maximum value for the packet sequence numbers is predefined, wherein the first packet sequence number has a value of approximately one-half of the maximum value, and wherein the second packet sequence number has a value of approximately the maximum value.

18. A computer-readable storage device including instructions executable by a processor for resynchronizing packets transferred in a digital network, wherein a packet includes a sequence number, the computer-readable storage device comprising:
determining first and second packet sequence numbers for communication from a sender, the first and second packet sequence numbers being in a range from a minimum value to a maximum value, wherein a value difference between the first and second packet sequence numbers is greater than one, and wherein neither the first sequence number nor the second sequence number has a value of one;
sending the first packet sequence number to a receiver, wherein the receiver includes an unknown expected packet sequence number;
sending the second packet sequence number, wherein the first and second packet sequence numbers have values such that a subsequently sent starting packet sequence number is guaranteed to be acceptable by the receiver regardless of a value of the unknown expected packet sequence number in the receiver; and
sending the starting packet sequence number to cause a resetting of the receiver to the starting packet sequence number, the starting sequence number being equal to one.

19. The computer-readable storage device of claim 18, wherein the maximum value for the packet sequence numbers is predefined, wherein the first packet sequence number has a value of approximately one-third of the maximum value, and wherein the second packet sequence number has a value of approximately two-thirds of the maximum value.

20. The computer-readable storage device of claim 18, wherein the maximum value for the packet sequence numbers is predefined, wherein the first packet sequence number has a value of approximately one-half of the maximum values and wherein the second packet sequence number has a value of approximately the maximum value.

* * * * *

UNITED STATES PATENT AND TRADEMARK OFFICE
CERTIFICATE OF CORRECTION

PATENT NO.       : 7,603,418 B1                                       Page 1 of 1
APPLICATION NO.  : 10/766607
DATED            : October 13, 2009
INVENTOR(S)      : Hong Xu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1302 days.

Signed and Sealed this

Fifth Day of October, 2010

David J. Kappos
*Director of the United States Patent and Trademark Office*